United States Patent [19]

Silverman

[11] 3,860,087

[45] Jan. 14, 1975

[54] VIBRATOR SYSTEMS FOR GENERATING ELASTIC WAVES IN THE EARTH

[76] Inventor: Daniel Silverman, 5969 S. Birmingham St., Tulsa, Okla. 74105

[22] Filed: Oct. 11, 1972

[21] Appl. No.: 296,670

Related U.S. Application Data

[63] Continuation-in-part of Ser. No. 223,896, Feb. 7, 1972, Pat. No. 3,789,951.

[52] U.S. Cl.................. 181/0.5 VM, 181/0.5 EC
[51] Int. Cl............................................. G01v 1/00
[58] Field of Search.... 181/0.5 H, 0.5 EC, 0.5 MW, 181/0.5 VM

[56] References Cited
UNITED STATES PATENTS

| | | | |
|---|---|---|---|
| 3,024,861 | 3/1962 | Clynch.............................. | 181/0.5 |
| 3,159,232 | 12/1964 | Fair................................ | 181/0.5 EC |
| 3,282,372 | 11/1966 | Brown et al..................... | 181/0.5 EC |
| 3,550,719 | 12/1970 | Meister........................... | 181/0.5 EC |
| 3,690,402 | 9/1972 | Stafford.......................... | 181/0.5 EC |
| 3,716,111 | 2/1973 | Lavergne........................ | 181/0.5 EC |

*Primary Examiner*—Maynard R. Wilbur
*Assistant Examiner*—T. M. Blum

[57] ABSTRACT

This invention describes an improved vibrator system having a vibrator comprising two parts, which reciprocate with respect to each other. One part is connected to a first frame which is in operative, force-transmitting contact with the earth. The second part is connected to a second frame. The second frame is connected to the first frame through compliance means.

A large mass which rests on the earth, and which can conveniently be a transport vehicle, has a part which overhangs the second frame. Means are provided to alternately support said mass on said second frame, and to support said second frame from said mass.

Various configurations of vibrator elements are disclosed, as well as several types of high pressure fluids for driving the vibrator.

17 Claims, 10 Drawing Figures

3,860,087

VIBRATOR SYSTEMS FOR GENERATING ELASTIC WAVES IN THE EARTH

CROSS REFERENCE TO RELATED APPLICATION

This application is a continuation-in-part of my copending application Ser. No. 223,896, filed 2-7-72, entitled Vibrator System for Generating Seismic Waves in the Earth now U.S. Pat. No. 3,789,951, which patent is included in this application by reference.

BACKGROUND OF THE INVENTION

This invention is in the field of vibrators. More particularly it is concerned with vibrator systems of high energy for generating seismic waves in the earth.

The prior art is represented by the following United States Pat. Nos. 2,910,134 Crawford, et al; 3,159,233 Clynch, et al; and 3,306,391 Bays.

In the geophysical exploration industry using the seismic method of mapping subsurface geology, there has been, in recent years, an increase in the use of a method of seismic prospecting called the Vibroseis system. This method, unlike the conventional explosive impulse method, uses a vibratory signal involving many cycles of alternating pressure against the surface of the earth. The frequency of the alternations generally varies with time, the signals being called "swept frequency" signals, which typically have a duration of from 5 to 7 seconds, and a frequency range of from 20–100 cps.

This swept freqeuncy seismic signal in the earth is generated by an electrohydraulic vibrator supported on a baseplate which is pressed into contact with the earth by a portion of the weight of the truck or other vehicle which transports the vibrator. The vibrator comprises a cylindrical mass (of weight up to 5,000 pounds) with a cylindrical bore containing a piston. Piston rods extend above and below the piston and are attached to a frame which surrounds the mass and is supported on the baseplate.

The vibrator is generally mounted near the middle of the truck or other transport vehicle. Those vehicles, such as trucks, which have a drive shaft, require that the vibrator be mounted on a tall structure, or tower, which is attached to the base plate, the legs of which straddle the drive shaft. The vibrator is mounted on top of the tower, where it is generally at an elevation above the bed of the truck. This large mass mounted on the high tower provides an unstable condition, and is a weakness of the prior art designs. Also, the large mass of the tower adds to the mass of the moving system and detracts from the oscillating force that can be applied to accelerate the earth. It is well known that one measure of the energy transmitted into the earth is the amplitude of motion of the baseplate. Also, the amplitude of motion of the moving system comprising piston, piston rods, frame, tower and baseplate for a constant force input, varies inversely to the mass of the moving system. Therefore, any excess mass in the moving system detracts from the force that can be applied to accelerate the earth.

SUMMARY OF THE INVENTION

It is a primary object of this invention to provide an electrohydraulic vibrator for mounting on a vehicle, wherein the vibrator is mounted at low elevation, directly on the baseplate.

It is a further object of this invention to provide a seismic vibrator which has a moving system of minimum mass.

It is a further object of this invention to provide a seismic vibrator in which a separate reaction mass for the vibrator is not required, but in which the mass of the vehicle serves both as a hold-down mass and as the reaction mass for the vibrator.

These objects are realized and the limitations of the prior art are overcome in this invention, in which the vibrator has two parts which reciprocate with respect to each other. A first part is connected to a first frame which is in operative contact with the earth. The second part is connected to a second frame, which is connected through a compliance means to the first frame. A large mass, which normally rests on the earth has a part which overhangs the second frame. Lifting means are provided between the second frame and the overhanging part of the mass, to lift the mass until at least part of the mass is above the earth, and thus, at least part of the mass is supported rigidly, without compliance, by the second frame, and part of the weight of the mass presses directly, ridigly, without compliance, down on the second frame and through the compliance means onto the first frame, which is pressed into contact with the earth.

The working relation between the first and second parts of the vibrator is such that their spacing can be varied and still operate, because when the weight of the mass presses down on the compliance its dimension will be decreased, and thus the spacing between the first and second parts will be decreased.

Conversely when the lifting means is relaxed, the mass is lowered to the ground. The same lifting means, which can conveniently be a hydraulic cylinder means, can go further and lift the second frame, until the first frame (which is connected to it through the compliance means) is lifted off the earth.

The large mass can conveniently be a transport vehicle for the vibrator, which serves not only to transport the vibrator when the second frame is lifted, but also to act as a reaction mass for the vibrator when the mass is lifted off the earth, and also to act as a holddown weighting means on the first frame.

The direction of reciprocation of the first and second parts of the vibrator can be perpendicular to the earth's surface, so as to generate principally compressional waves in the earth. Or, the direction of reciprocation can be horizontal, so as to generate principally shear waves in the earth.

The two parts of the vibrator can be reciprocally driven with various kinds of fluid such as high pressure liquid, or high pressure gas, such as air or steam, or by explosive gas mixtures.

The vibrator can be an expandible chamber, a piston and cylinder, a double acting piston and cylinder, a plurality of chambers, etc.

BRIEF DESCRIPTION OF THE DRAWINGS

These and other objects of this invention and a better understanding of the principals and details of the invention will be evident from the following description taken in conjunction with the appended drawings, in which.

DESCRIPTION OF THE PREFERRED EMBODIMENT

Figure 1:
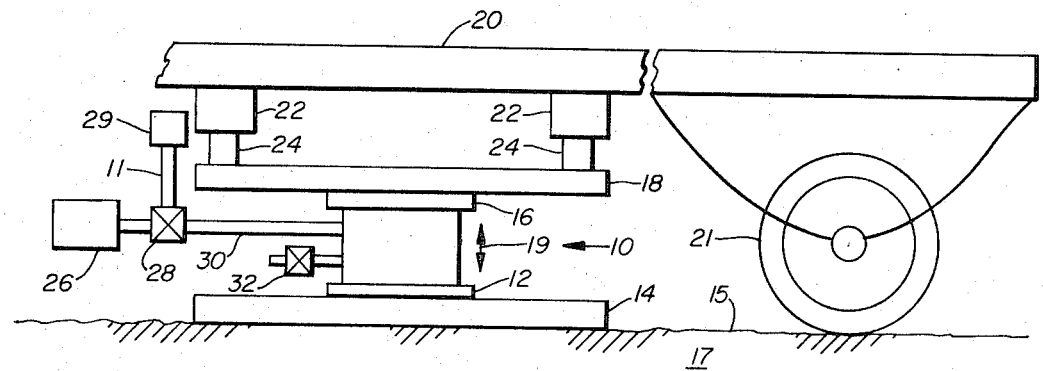
FIGS. 1 and 2 represent embodiments of this invention having single expansible chambers.

Referring now to the drawings and in particular to FIG. 1, numeral 10 indicates generally an expandable chamber which can be called a vibrator, which has two parts 12 and 16 which reciprocate with respect to each other, in accordance with arrow 19. A first part 12 is fastened to a first frame 14 which is in contact with the surface 15 of the earth 17. The second part 16 is fastened to a second frame 18.

As will be explained in detail later, the chamber or vibrator 10 can be a flexible-walled chamber, a piston and cylinder, or other device. It can be expanded and contracted by means of pulses of high pressure fluid, such as might be stored in an accumulator 26 and controlled by valve 28 to line 30 to the interior of the chamber 10.

The valve 28 can conveniently be a three way valve alternately controlling high pressure fluid to the chamber, and passing the high pressure fluid from the chamber to a pipe 11 and to a low pressure accumulator 29, where it can be pumped to the high pressure accumulator 26 by means not shown but well known.

Alternatively the pipe 11 can lead to the atmosphere, so that if the high pressure fluid is a gas, such as air or steam, it can be vented to the atmosphere.

Alternatively a valve 32 can be set as a fluid leak, so that fluid flows continuously, at a low selected rate, from the chamber 10 to a low pressure accumulator or to the atmosphere.

The valve 28 can conveniently be an electrohydraulic valve such as now used on conventional electrohydraulic vibrators. Such valves are commercial articles of commerce, are well known in the art, and do not require further detailed description.

The second part 16 is connected to a second frame 18. There is a large mass 20 which overhangs the second frame 18. This mass can conveniently be a transport vehicle, truck, trailer, or other such device. Lifting means 22, 24, shown conveniently as hydraulic cylinders and pistons, serve to lift the mass 20 so that when at least part of the mass, such as the wheels 21 are off the ground, at least part of the mass 20 will press down on the second frame 18 with part of the weight of the mass 20.

The mass 20 is in direct, rigid force-transmitting contact with the second frame 18, and so long as the downward acceleration of the frame 18 while the vibrator is operating is less than the acceleration of gravity, the mass and frame 18 will be in continuous operative, rigid, non-compliant force-transmitting relation, and a portion of the mass 20 will be a reaction mass for the vibrator. The vibrator 10 has no reaction mass, other than the mass of the second part 16 and the mass of the second frame 18. The sum of these two masses is entirely inadequate to provide the size of reaction mass needed for this service, which, in conventional vibrator systems, utilizes reaction masses which weigh up to 5,000–6,000 pounds, or more. With truck weights of 15–20,000 pounds or more, even though only half of the mass of the truck would be available to serve as reaction mass, that would still be more mass than is currently used in the largest commercial vibrators.

Figure 2:
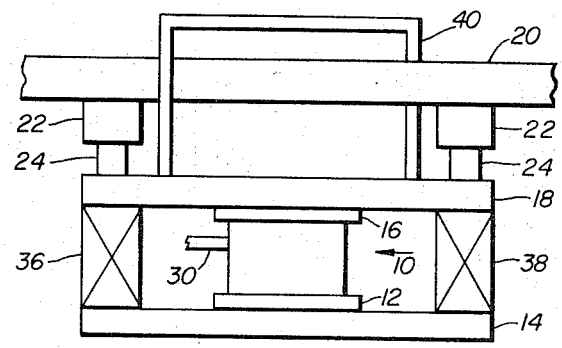

In FIG. 2 is shown a variation of the embodiment of FIG. 1 in which there are included a plurality of compliances 36, 38, between the second and first frames. Whereas, in FIG. 1 the total weight of the mass 20 must be supported by the pressure of the fluid in the chamber 10, in FIG. 2 the weight of the mass resting on the second frame is supported by the compliances 36, 38. The pressurized fluid then supplies only the pulsating component of the force shown in FIG. 1.

Also shown in FIG. 2 is a third frame 40 which is attached to a second frame 18, and which surrounds the mass 20. The lifting means 22, 24 expands to lift the mass upwardly with respect to the second frame. When this lifting means is raised further the mass 20 will press upwardly against the third frame 40. In this condition the mass and the second frame are rigidly locked together. Depending on the force applied by the lifting means, the mass can be accelerated at higher accelerations than gravity, and it will still be rigidly locked to the second frame.

In FIGS. 1 and 2 the expandable chamber 10 is described as a flexible walled chamber, such as a convoluted surface or an elastic wall, or a bag, etc.

Figure 3:
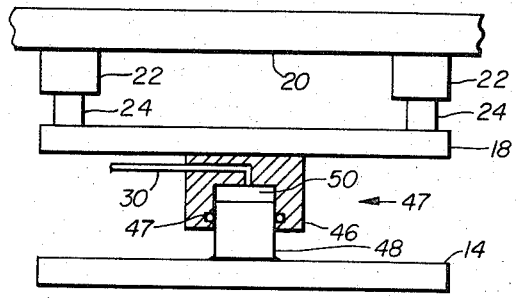
FIGS. 3 and 4 illustrate the use of single and double-acting pistons and cylinders.

Such flexible-walled chambers or containers that can support very high internal pressures are manufactured by, and are available from, the Firestone Tire and Rubber Company. Such containers, or bags, are used as compliances connected between the truck and the baseplate in conventional seismic vibrators to support the weight of the truck. They are in wide useage also as "springs" for heavy trucks and other vehicles. While the bags in common useage are gas-filled, the manufacturer claims that selected liquids (not damaging to the material of which the bags are constructed) can be used as a pressure fluid to drive the bag as a hydraulic actuator of relatively limited stroke. In FIG. 3 it is shown that the chamber can comprise a cylinder 46 with a piston 48 sealed therein by means 47. As pressurized fluid is injected into the inside of the cylinder by means of the valve 28 and pipe 30, the piston will be forced down, pressing on the first frame 14 and on the earth, to generate a seismic wave.

Figure 4:
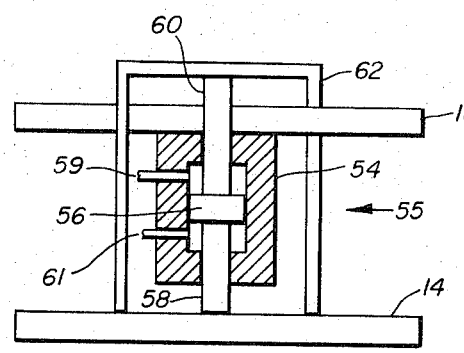

FIG. 4 illustrates an embodiment comprising a cylinder 54 attached to the second frame 18, a piston 56 and two piston rods 58, 60 supported by the first frame 62 and 14. Pressurized fluid can be valved alternately to both sides of the piston, as is customary in present day vibrators. It is well to remember, however, in this system, there is very little mass associated with cylinder and second frame 18. The large reaction mass is the portion of the mass of the vehicle as shown in FIGS. 1 and 2, whereas in the prior art the reaction mass is added directly to, and supported by the cylinder. This 5,000 to 6,000 pounds of weight serves no other purpose than as reaction mass. Compared to this invention, in which a part of the mass of the vehicle is used as the reaction mass, the prior art simply carries 6,000 pounds of dead weight.

Figure 5:
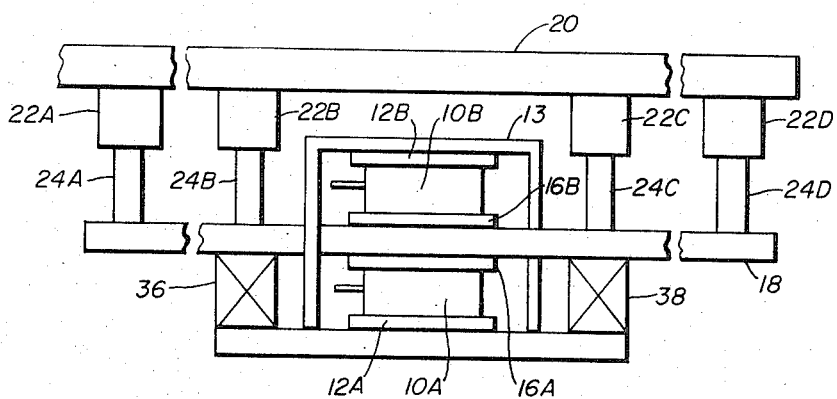
FIG. 5 is a variation of FIG. 2 having two chambers.

FIG. 5 illustrates a variation of FIG. 2 except with 2 expandable chambers, mounted on either side of the second frame 18. Thus chambers 10A, 10B are mounted one above, and one below the second frame 18. Parts 16A, 16B are fastened to the second frame 18. Similarly the other parts 12A, 12B are connected to a frame 13 which is part of first frame 14, in contact with the earth. The compliances 36, 38 can be used as in FIG. 2, or not used, as in FIG. 1.

The second frame 18 is shown as having considerable length in the longitudinal direction of mass 20. By making this second frame of great rigidity and by using many lifting means 24A, 24B, 24C, 24D, 22A, 22B, 22C, 22D, etc., the mass 20 can utilize the rigidity of the frame 18 to give it support at a large number of points and so overcome problems due to resonance vibrations of parts of the mass 20 due to lack of sufficient rigidity of the mass itself.

Figure 6:
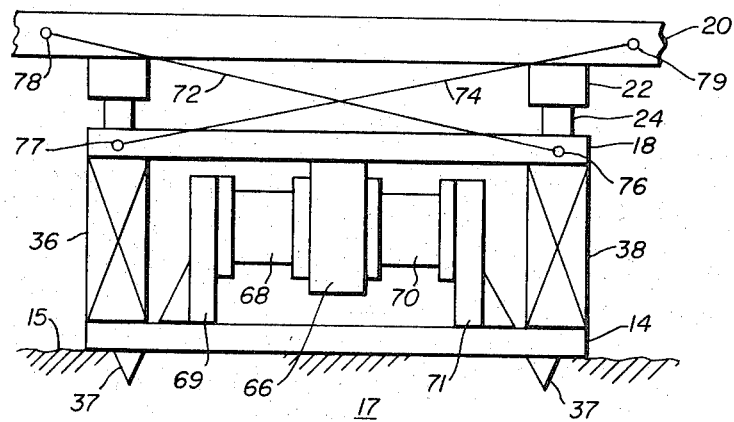
FIG. 6 illustrates a system with horizontal axis of reciprocation.

In FIGS. 1–5, the axis of reciprocation between the two parts of the vibrator 14 and 18 is directed perpendicular to the surface 15 of the earth. In this direction of reciprocation the seismic waves generated in the earth are predominantly compressional waves. In FIG. 6 an embodiment of this invention is shown in which the direction of reciprocation is parallel to the surface of the earth, for the generation of shear waves.

In FIG. 6 there are two vibrator chambers 68, 70, each of two parts which reciprocate horizontally with respect to each other. Chamber 68 has parts 69, 66, while chamber 70 has parts 71 and 66. Parts 69 and 71 are fastened rigidly to the first frame 14 in contact with the earth, while part 66, common to both chambers is fastened to second frame 18. Second frame 18 is fastened to first frame 14 through compliances 36, 38. Also lifting means 22, 24 are provided (as in FIG. 2) to lift the mass 20 and support it from the second frame. Thus, the weight of the mass 20 provides a holddown force on the first frame 14.

Force transmitting members 72, 74 shown schematically are connected between the second frame 18 (or part 66) and the mass 20. These are mounted for rotary motion about pivots 77, 79 for member 74, and 76, 78 for member 72. The geometry is such that the members 72, 74 are as nearly horizontal as possible. Thus the forces that they transmit to the mass will be principally horizontal forces. In this condition the mass 20 becomes a reaction mass for the moving part 66 of the vibrators, and no separate reaction mass is required.

The chambers 68, 70 can be similar to those shown in FIGS. 2, 3 or 4, except that two of those 10, or 47 are required, while only one like 55 of FIG. 4 would be required. The valving of high pressure fluid to such vibrators as 10, 47, 55 are well known in the art and need not be described in greater detail at this time. In FIG. 6, as in FIG. 2, the mass 20 serves both as the reaction mass of the vibrator and the holddown weight of the first frame. Some means such as the points 37 on the bottom of the first frame, or baseplate 14, will serve to transmit the vibratory motion of the frame 14 to the earth 17.

Figure 8:
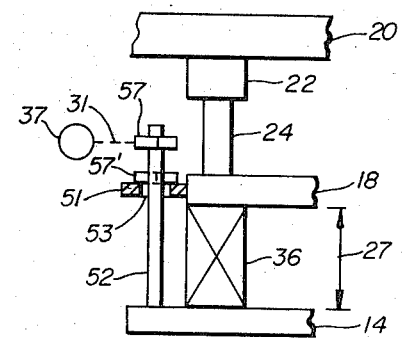
FIGS. 7 and 8 illustrate two different means to couple the mass to the vibrator.
Figure 7:
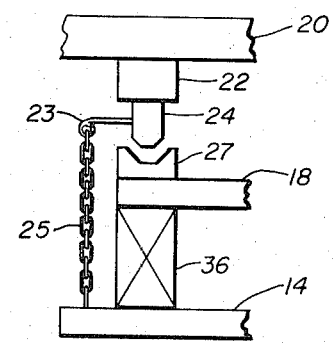

In FIGS. 7, 8 are shown two ways in which the mass 20 can be supported by the second frame 18. The method shown in FIG. 7 is to provide a socket on the frame 18 into which the extensible member 24 can be seated. This might include a conical point on the rod 24 and a correspondingly shaped seat 27 on the frame, as shown. When the rod 24 is retracted it lifts out of the seat 27 and is free of the frame 18. Means such as arm 23 and chain or cable 25 permit the ram or rod 24 to lift the first frame 14 off the surface of the earth for transport purposes.

In FIG. 8 the ram or rod 24 is shown as rigidly fastened to the second frame 18. A means to lift the first frame is shown as arm 51 with an opening 53 therethrough, providing clearnace for a rod 52 attached to the first frame 14. A head 57 is provided on the rod 52. This can be a nut on threads on the rod 52 to provide vertical adjustment.

It will be clear that when the ram 24 is rigidly fastened to the second frame 18, there will be a wide difference in spacing between first and second frame between the operating condition when the compliances are compressed under the weight of the mass, and the travelling condition when there is no weight on the compliances. Thus the construction of the vibrator chamber must be designed to accommodate to this spacing.

With further reference to FIG. 8 it is contemplated that after the vibration is completed, but before the mass is lowered to the ground, the nut 57 will be driven down, by motor means 37 through means 31, so that the spacing 27 between first and second frame 14, 18 will be locked to a value substantially equal to the dimension when the weight of the mass 20 is resting on the second frame. Also, after the vehicle has moved to a new location, and the mass 20 is resting on the second frame, and before the vibration has started, the nut 57 is driven outwardly from its position 57' to position 57. This will allow for variation of the dimension 27 due to the action of the vibrator.

While the fluid conventionally used in geophysical vibrators is high pressure liquid, this invention is adapted to the use of liquids, gases, and/or explosive gas mixtures. FIGS. 3 and 4 are adapted to use high pressure liquid. The chambers, such as illustrated in FIGS. 1, 2, 5 and 6 can use high pressure liquid or high pressure gas, such as compressed air or steam. The use of a simple one-way valve, shown in FIG. 1 with a constant leak opening, is convenient for use with gases such as air or steam.

Figure 9:
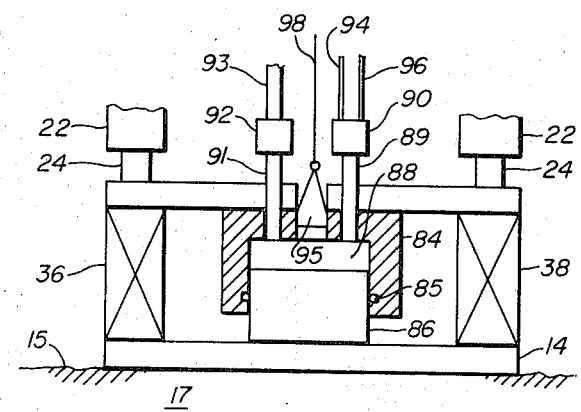
FIGS. 9 and 10 illustrate the use of explosive gas mixtures as the working fluid.

In FIG. 9 there is illustrated an embodiment of this invention based on FIGS. 2 and 3 in which the vibrator 10 is a piston and cylinder system adapted to use an exploding mixture of gas to provide the force to drive the vibrator.

The vibrator is shown as a piston 86 slidable in a cylinder 84 and sealed by means such as seal 85. This can conveniently be an O-ring as is well known in the art, or a plurality of piston rings as are used in internal combustion engines. The piston 86 is rigidly fastened to a first frame 14 in pressure transmitting contact with the surface 15 of the earth 17. The cylinder is rigidly fastened to second frame 18, which may be connected to first frame 14 by means of compliances 36, 38. Lifting means 22, 24 are provided as in FIGS. 1 and 2 to lift the mass 20 from the second frame 18.

Shown in the cylinder 84 are an inlet valve means 90 and an outlet valve means 92. Pipes 94, 96 leading to the inlet valve 90 carry respectively a combustible gas such as propane or gasoline vapor, and an oxygen-containing gas such as air or oxygen. These are metered in the proper ratio of volumes and pressures to provide an explosive gas mixture in the space 88 inside the cylinder. A detonating means 95, such as a spark plug, is inserted into the cylinder wall to detonate the gas mixture by means of an appropriate voltage on lead 98.

The art on the design of internal combustion engines provides much background for the design of this type of vibrator, including the choice and metering of gases, the design of valves, etc., and need not be discussed in detail at this time. This vibrator will differ in one important respect from an engine, however, and that is, the relative travel distance of the piston will be much less than in an engine. Thus the gas must be introduced under pressure. Also, the timing of the valves must be such as to provide an interval of time during which both valves are open, so that the incoming gases can sweep out the products of combustion of the preceding explosion.

The valves may be operated by servo hydraulic actuators, controlled by the electrical signal which controls the vibrator.

Figure 10:
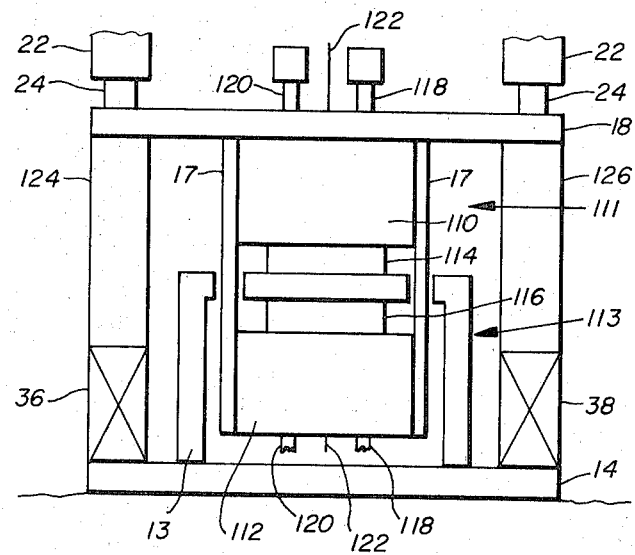

In FIG. 10 there is shown a variation of FIG. 9 corresponding to the variation in FIG. 5 of the embodiment of FIG. 1. There are two explosive chambers 111, 113. The two pistons 114, 116 are connected to frame 13 which is part of first frame 14, which rests on the earth. The two cylinders 110, 112 are connected to frame 17 which is part of second frame 18. Second frame 18 is connected to first frame 14 by compliances 36, 38, etc. The valves 118, 120 and detonator 122 are similar to the valves 90, 92 and detonator 98 of FIG. 9. By introducing the explosive gas mixture alternately to the systems 111, 113, the system will be equivalent to the double acting fluid system of FIG. 4.

While the invention has been described with a certain degree of particularity, it is manifest that many changes may be made in the details of construction and the arrangement of components. It is understood that the invention is not to be limited to the specific embodiments set forth herein, by way of exemplifying the invention, but the invention is to be limited only by the scope of the attached claim or claims, including the full range of equivalency to which each element or step thereof is entitled.

What is claimed is:

1. A system for creating a train of seismic waves in the earth comprising:
   a. at least one expandable chamber comprising at least two parts reciprocable with respect to each other;
   b. a first part connected to a first frame in contact with the earth;
   c. a second part connected to a second frame;
   d. means to inject a train of pulses of pressurized fluid into said chamber;
   e. a mass resting on the earth's surface and having a portion over-hanging said second frame; and
   f. means alternately to place said mass in rigid, non-compliant compressive force-transmitting contact with said second frammme, while said chamber is operating, and in tensile force-transmitting contact with said second frame while said chamber is not operating.

2. The system as in claim 1 including at least one compressible compliance connected between said second frame and said first frame.

3. The system as in claim 1 in which said means to place said mass in rigid, non-compliant compressive force transmitting contact with said second frame comprises a plurality of vertically extensible means arrayed in a two-dimensional pattern between said second frame and said mass to lift at least a part of said mass above the earth.

4. The system as in claim 1 in which said means to place said mass in tensile force transmitting contact with said second frame comprises means attached to said mass to lift said second frame and said first frame above the earth.

5. The system as in claim 1 in which said expandable chamber comprises at least a cylinder, and a piston seatably reciprocable in said cylinder.

6. the system as in claim 1 in which said expandable chamber comprises a cylinder, a piston sealably reciprocable in said cylinder, and means to apply said pulses of pressurized fluid alternately to both sides of said piston.

7. The system as in claim 1 in which said expandable chamber comprises a closed, flexible-walled chamber.

8. The system as in claim 1 in which said pressurized fluid comprises a high pressure liquid.

9. The system as in claim 1 in which said pressurized fluid comprises a high pressure gas.

10. The system as in claim 1 in which said pressurized fluid comprises an explodable mixture of gases, and including means to detonate said explodable gas mixture.

11. The system as in claim 1 in which the direction of reciprocation of said first and second parts in perpendicular to the earth's surface.

12. The system as in claim 1 in which the direction of reciprocation of said first and second parts is parallel to the earth's surface.

13. The system as in claim 1 including fluid leak means connected between the inside volume of said chamber and a low pressure fluid space outside said chamber.

14. The system as in claim 1 including at least two expandable chambers in series, said second frame connected to the junction between the two chambers, said first frame connected to the two free parts of said two chambers, said pulse of pressurized fluid injected alternately into said two chambers.

15. The system as in claim 1 including means to alternately clamp and unclamp said second frame to and from said mass.

16. The system as in claim 1 including means to limit the spacing between said first and second frame so that their spacing is substantially the same as when the weight of the mass rests on said second frame.

17. The system as in claim 1 in which said second frame is of substantial flexural rigidity and of substantial longitudinal dimension compared to said mass, and said second frame is in rigid, non-compliant force-transmitting contact with said mass at a plurality of spaced points in a two-dimensional pattern;

whereby the flexural rigidity of said second frame serves to minimize the flexural vibration of said mass.

* * * * *